United States Patent [19]

Hadden

[11] 4,179,231

[45] Dec. 18, 1979

[54] DRILL GUIDE

[76] Inventor: Terence B. Hadden, 1745 De Séve, Apt. 3, Montreal, Quebec, Canada, H4E 2B1

[21] Appl. No.: 956,196

[22] Filed: Oct. 30, 1978

[51] Int. Cl.[2] .............................................. B23B 39/00

[52] U.S. Cl. ...................................... 408/112; 408/110

[58] Field of Search .................... 408/712, 112, 115 R, 408/99, 84, 110, 111, 113, 95, 98, 72

[56] References Cited

U.S. PATENT DOCUMENTS

| | | | |
|---|---|---|---|
| 1,299,938 | 4/1919 | Hathaway | 408/115 X |
| 1,316,028 | 9/1919 | Halbreich | 408/115 X |
| 1,590,643 | 6/1926 | Neuwelt | 408/112 |
| 2,360,942 | 10/1944 | Ellerstein | 408/84 X |
| 2,622,458 | 12/1952 | Jenkins | 408/712 X |
| 2,883,891 | 4/1959 | Shulters et al. | 408/112 |
| 2,997,900 | 8/1961 | Pugsley | 408/112 X |
| 3,293,953 | 12/1966 | Hendrick | 408/112 |
| 3,833,313 | 9/1974 | Gallion | 408/112 |
| 3,874,810 | 4/1975 | Russell | 408/99 X |
| 4,105,359 | 8/1978 | Schneider | 408/112 |

FOREIGN PATENT DOCUMENTS

| | | | |
|---|---|---|---|
| 2626945 | 12/1977 | Fed. Rep. of Germany | 408/112 |
| 1007649 | 5/1952 | France | 408/112 |
| 662725 | 12/1951 | United Kingdom | 408/112 |
| 967019 | 8/1964 | United Kingdom | 408/112 |

*Primary Examiner*—William R. Briggs

[57] ABSTRACT

A tool guide, particularly for an electric hand drill, to affix to a drill and guide it in drilling a hole perpendicular to a surface. The guide has drill holding means which incorporates a manually adjustable locking mechanism which allows for the ready accommodation of drill bits of different sizes. The guide has also drill fixing means onto its drill holding means to instantly, firmly and independently hold the guide onto the drill during operation.

6 Claims, 7 Drawing Figures

FIG. 3
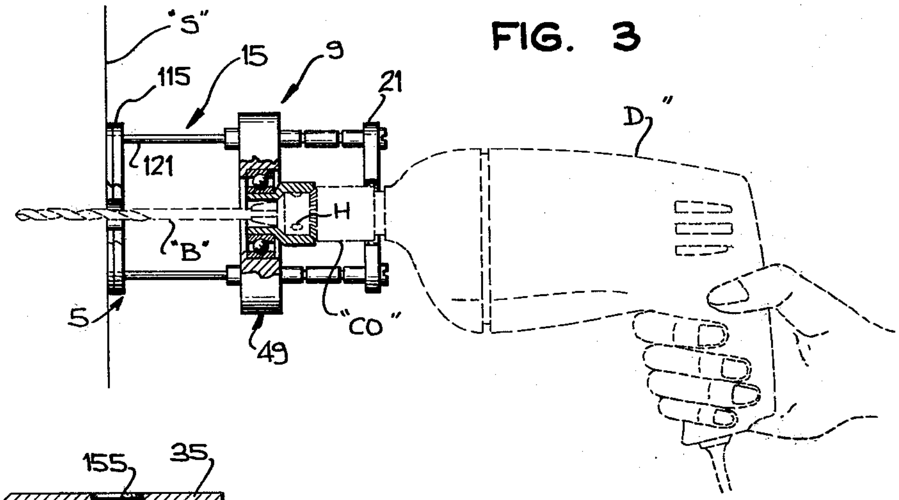
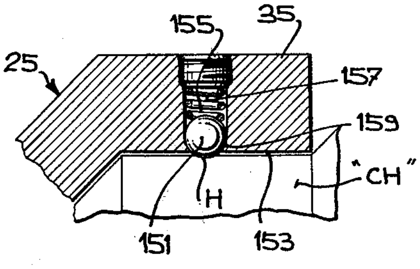
FIG. 3A
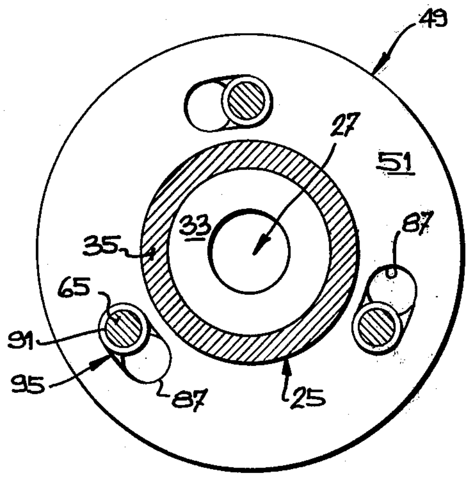
FIG. 4
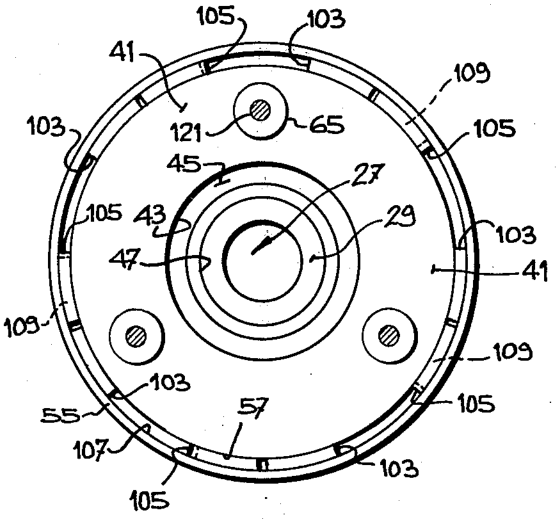
FIG. 5
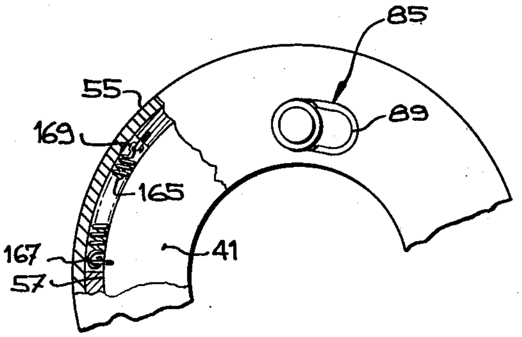
FIG. 6

DRILL GUIDE

The present invention relates to a tool guide, and more particularly to a hand drill guide of the type which holds and guides a drill for movement in a desired direction during use.

Drilling of a hole into a member or wall in a direction perpendicular to the outer surface of the member or wall, is a very conventional and frequent operation which however can be difficult to do using a hand drill. Devices are known for holding a hand drill and guiding it during use so that the drill bit moves in a direction perpendicular to the member or wall surface to drill a perpendicular hole. Such devices are shown, by way of example, in U.S. Pat. Nos. 1,590,643; 2,622,458; 2,997,900 and 3,464,295. Each of these devices essentially comprise a flat presser plate, guide rods extending perpendicularly from the plate, and a drill holder movably mounted on the rods for movement toward and away from the plate. The drill is mounted in the drill holder with the drill bit extending toward the presser plate, perpendicular thereto and parallel to the rods. The device is then positioned with the presser plate flat against the wall where a hole is to be drilled and the drill is pushed toward the plate, and wall. The drill, carried by the holder, is moved along the rods and drills a perpendicular hole, the drill bit passing through a hole in the presser plate.

These known devices have disadvantages however. Many of them do not properly hold the drill with the holder to have the drill bit always maintained parallel with the guide rods. It is also necessary to provide a holding device which is adjustable to accomodate drill bits of different size. U.S. Pat. Nos. 2,622,458 and 2,997,900 show such devices. However a separate tool, such as a screwdriver, is required to effect adjustment. In addition, the holding means in these devices are relatively complicated in construction.

Another disadvantage in the known devices lies in that the drill cannot be simply connected to the guiding device. Either complicated means are required to connect the drill to the device as shown in U.S. Pat. No. 2,997,900 by way of example, or else both hands of the operator must be used to hold the drill and guide device together.

It is an object of the present invention to provide a tool guide, more especially a drill guide, which is relatively simple in construction and use.

It is another object of the invention to provide a drill guide which has means for firmly holding the drill so as to accurately guide the same.

It is a further object of the invention to provide a device guide which is manually and readily adjustable to accomodate drill bits of different size without requiring the need of any tools for the adjustment.

It is still another object of the invention to provide simple means for detachably connecting the guide and drill together without necessitating the operator to use his hands to maintain the connection.

In accordance with the present invention, these objects are achieved with a drill guide having a drill holder and a drill positioning means. Manually operable means are provided for use in adjusting the distance between the drill holder and the drill positioning means so as to accommodate drill bits of different size.

The drill guide according to the invention comprises drill holding means including a leg support, drill centering means and a set of tubular legs extending from the leg support to the centering means for connecting the same together. The drill centering means is slidably mounted on the legs for movement toward or away from the guide member and includes means for fixing the drill.

The drill guide according to the invention also comprises manually operable means on the drill holding means for use in adjusting the distance between the leg support and the centering means. These manually operable means comprise a locking member on the drill centering means and spaced-apart stops on the legs. The locking member is operable to selectively cooperate with the stops to lock the drill centering means in a selected position on the legs.

The drill guide according to the invention further comprises guide positioning means, and a set of rods slidably mounted in the tubular legs for movably connecting the drill holding means and guide positioning means together.

Preferably the locking member is rotatably mounted on the drill centering means, and means are provided for retaining the locking member in a locked position.

The retaining means may comprise cooperating magnets on the locking member and the drill centering means, or spring means connected between the locking member and the drill centering means to rotatably bias the locking member to a locked position.

The invention will now be described in detail having reference to the accompanying drawings in which:

FIG. 3 is an elevation view of the hand drill guide shown in FIGS. 1 and 2, in use;

Figure 1:
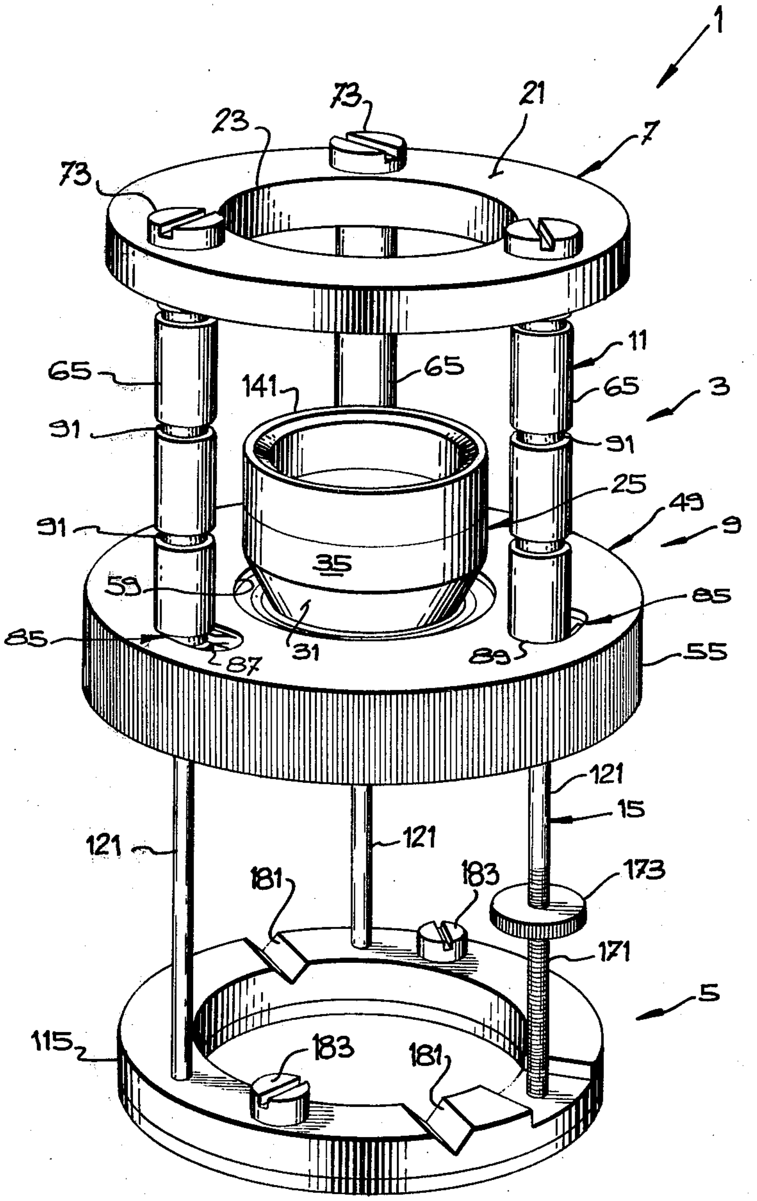
FIG. 1 is a perspective view of a hand drill guide according to the invention with a first embodiment of drill holding means.
Figure 2:
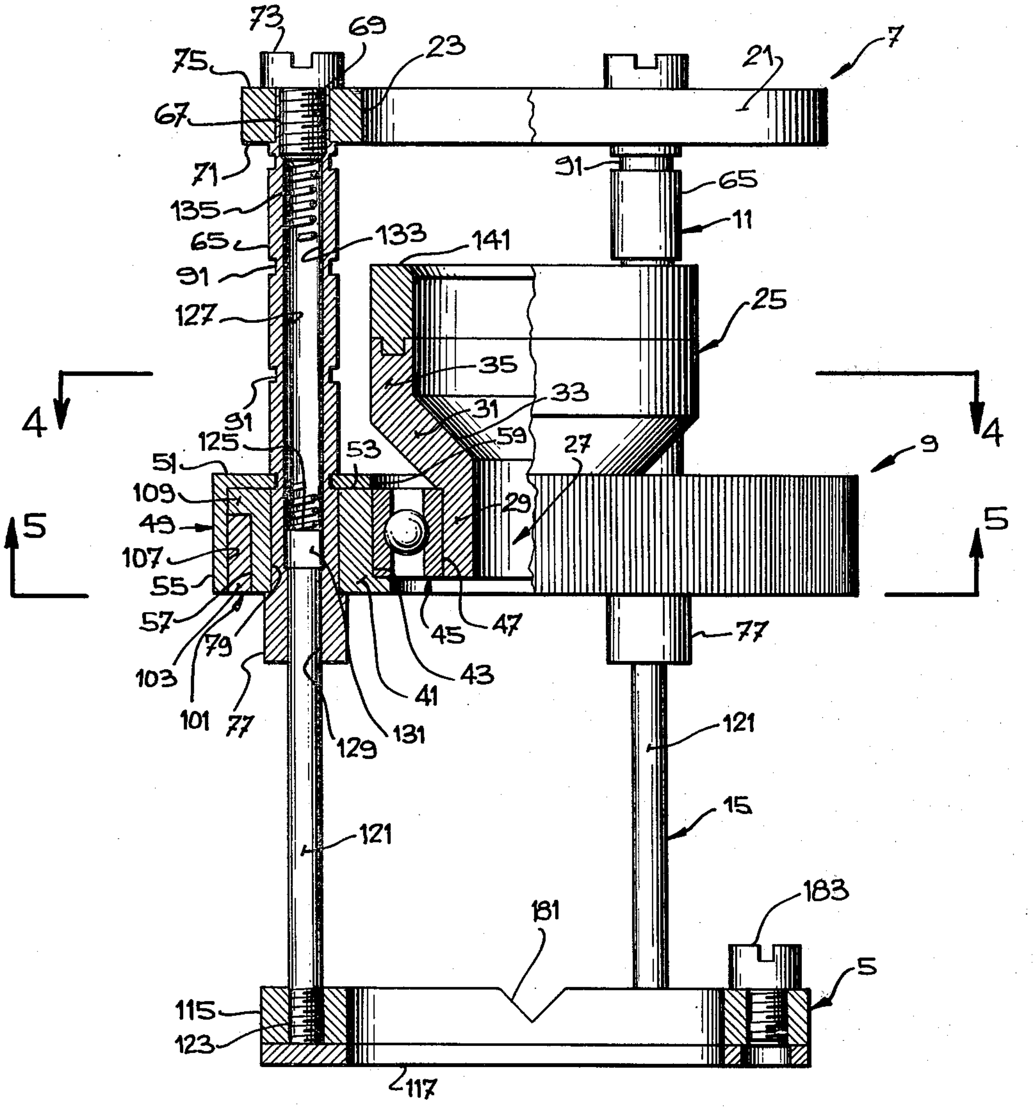
FIG. 2 is an elevation view of the hand drill guide shown in FIG. 1, in partial cross-section.

FIG. 3*a* is a detail view of another embodiment of drill fixing means;

FIG. 4 is a cross-section view taken along line 4—4 of FIG. 2;

FIG. 5 is a cross-section view taken along line 5—5 of FIG. 2; and

FIG. 6 is a view similar to FIG. 4 showing another embodiment of the means for retaining the locking cover in a locked position.

The drill guide 1 shown in the drawings is used for holding and guiding a hand drill for movement in a desired direction.

The drill guide 1 is shown being used with an electric, hand-operated, drill; however, it can be used with other similar types of tools as well.

The drill guide 1 has drill holding means 3 and guide positioning means 5. The drill holding means 3 comprises a leg support 7 and a drill centering means 9. The leg support 7 and the drill centering means 9 are connected together by first connecting means 11. In accordance with the present invention, the distance between the guide positioning means 5 and the centering means 9, along the connecting means 11, can be manually adjusted, as will be described, so that the holding means 3 can accommodate drill bits of different sizes.

The guide positioning means 5 are movably connected to the drill holding means 3 by second connecting means 15. The guide positioning means 5 normally are biased away from the drill holding means 3 in a direction parallel to the aligned axis of the leg support 7 and the centering means 9, the guide positioning means 5 is constructed to bear against a work surface "s" (see FIG. 3) so as to have the aligned axis of the leg support 7 and the centering means 9, and thus the axis of a held drill, in a direction perpendicular to the work surface "s".

In more detail, the leg support 7 comprises a circular plate 21 with a central circular aperture 23 in which may be inserted the collar "CO" of a drill "D". The drill centering means 9 has a centering receptacle 25 for snugly receiving, and centering the chuck "CH" of the drill "D" (see FIGS. 3 and 3A). The receptacle 25 is generally cup-shaped and has a central aperture 27 in a small, cylindrical end portion 29 through which the drill bit "B" of the drill passes. The receptacle 25 has a truncated conical middle portion 31 adjacent the end portion 29, the inner surface 33 of which centers the drill relative to the aperture 27. A large cylindrical portion 35 extending from the large end of the conical portion 31 completes the receptacle 25.

The receptacle 25 is rotatably mounted in a mounting plate 41. The mounting plate 41 has a central aperture 43 in which a ring bearing 45 is fixedly mounted. The small, cylindrical end 29 of the receptacle 25 is fixedly mounted within the bore 47 of the bearing 45.

A manually operable locking cover 49 is rotatably mounted on the plate 41 as will be described hereinafter. The cover 49 has a circular cover plate 51 which rests on the top surface 53 of the mounting plate 41 and a circular skirt 55 extending from the outer edge of the cover plate 51 to lie adjacent the circular edge 57 of mounting plate 41. A central aperture 59 is provided in the cover plate 51 through which the receptacle 25 freely passes. The outer surface of the skirt 55 is knurled so that it can be easily gripped.

The first connecting means 11, connecting the leg support 7 and the centering means 9, comprise three support legs 65. The legs 65 preferably are tubular for reasons to be described. The support legs 65 connect the guide plate 21 and the mounting plate 41 together in parallel relation with the apertures 23 and 43 aligned. The legs 65 are equally spaced about the apertures 23, and 43. One end 67 of each leg 65 is reduced slightly in size and fits snugly into a bore 69 in the guide plate 21 to extend perpendicularly from one side 71 of the plate. A screw or bolt 73 is threaded into the one end 67 of the leg 65, from the other side 75 of the plate 21, to fix the leg in place. The other end 77 of each leg 65 is enlarged. The mounting plate 41 has through bores 79 through each of which a leg 65 passes allowing the plate 41 to slide along the legs 65 between the enlarged ends 77 on the legs 65 and the guide plate 21. The legs 65 also each pass through an opening in the cover plate 51. Each opening comprises a short, arcuate slot 85 having a large end 87 and a smaller end 89. The end 87 of slot 85 has a width slightly larger than the diameter of leg 65 while the end 89 has a width slightly less than the diameter of leg 65. The slots 85 are concentric about the aperture 59.

A plurality of locating stops, in the form of spacedapart circular grooves 91, are provided along each leg 65 between its ends 67 and 77. Each groove 91 has a width slightly greater than the thickness of the cover plate 51. The diameter of each groove 91 is slightly smaller than the width of the small end 89 of the slots 85.

With the locking cover 49 manually rotated on the mounting plate 41 to have the large ends 87 of the slots 85 aligned with the legs 65, the drill centering means 9 can be slidably moved along the legs 65 to vary the distance between the drill centering means 9 and the guide positioning means 5 in increments based on the distance between adjacent grooves 91. When the desired distance is obtained, the cover is manually rotated in the opposite direction to move the small end 89 of the slots 85 into the grooves 91 to lock the drill centering means 9 in place.

Means 101 are provided for retaining the locking cover 49 in a locked position in a selected groove location.

In one embodiment, these retaining means 101 can be magnetic. As shown in FIGS. 2 and 5, a first set of magnets 103 is mounted on the peripheral edge 57 of the plate 41 in spaced apart relation. A second set of magnets 105 is mounted on the inner surface 107 of the skirt 55 in spaced apart relation. Of course, a gap is provided between the skirt 55 on the cover 51 and the edge 57 to receive the magnets 103 and 105. In this gap, appropriate cotter means 109 are provided for holding the locking cover 49 and the plate 41 together. These cotter means 109 which are integral with the plate 41, are positioned so as to bear against the upper surfaces of the magnets 105 mounted on the inner surface 107 of the skirt 55 when the locking cover 49 is in a locked position in a selected groove location. The sets of magnets 103 and 105 are arranged in pairs, one from each set, to have attracting opposite poles adjacent each other when the cover 51 is rotated, to lock the latter in a selected set of grooves 91 and to retain it in this position. Rotation of the cover 51 in the opposite direction "unlocks" the magnets allowing the plate 41 to be repositioned along the legs 65.

In another embodiment, the means 101 used for retaining the locking plate 49 in a locked position to hold the drill centering means 9 in a selected position along the legs 65, comprise one or more tension springs 165 located about a portion of the peripheral edge 57 of the mounting plate 41, as is shown in FIG. 6. One end 167 of each spring 165 is fastened to the plate 41 and the other end 169 is fastened to the cover skirt 55. Appropriate cotter means (not shown) are also used to hold the locking cover 49 to the plate 41. The springs 165 tend to pull the cover 49 to a locked position in the selected groove set on the legs 65. When it is desired to change the position of the drill centering means 9, the cover 49 is rotated on the plate 41 against the force of the springs 165 to unlock it from the legs 65.

In a further embodiment, the retaining means 101 comprise a thread in the inner surface 107 of the skirt 55, which thread matches a corresponding thread provided in the peripheral edge 57 of the plate 41. When it is desired to change the position of the drill centering means 9, the locking cover 49 is unscrewed from the plate 41 to unlock it from the legs 65.

The guide positioning means 5 comprises a ring 115 having a flat, cushioned locating surface 117 adapted to be placed flat against a work surface "S" in which a hole is to be drilled. The second connecting means 15 comprise a set of rods 121, preferably three in number. Each rod 121 is fixedly connected at one end 123 to the ring 115 and slidably connected at its other end 125 to the drill holding means 3. More particulary each rod 121 is slidably mounted within a through bore 127 in a leg 65. The bore 127 has a stepped-down portion 129 at its end nearest the ring 115, and the other end 125 of the rod 121 has an enlarged head 131 to fit snugly within the larger major portion 133 of the bore 127. The head 131 prevents the rod 121 from leaving the bore 127 altogether.

Resilient means normally bias the ring 115 away from the holding means 3. These resilient means comprise a compression spring 135 located within the major portion 133 of each bore 127 between the head 131 of each rod 121 and the screw 73 which is threaded into the open end of bore portion 133.

Drill fixing means are provided on the receptacle 25 for holding the drill guide 1 to the chuck "CH" of the drill "D". In an embodiment shown in FIG. 2, these fixing means comprise a ring magnet 141 mounted on the end of the cylindrical portion 35 of the receptacle 25.

In use, the drill centering means 9 of the guide 1, by using the locking cover 49, as previously described, is adjusted along the legs 65, relative to the positioning means 5 to accommodate the size of the drill "D" to be used. The drill "D", is then placed in the guide 1, the drill bit "B" passing through the aperture 27 in the receptacle 25. The drill chuck "CH" fits into the receptacle 25 with the conical portion 31 centering the drill and with the ring magnet 141 holding the drill "D" and the guide 1 together. The chuck "CH" of the drill is passed through the aperture 23 in guide plate 21. The receptacle 25 serves to orientate the drill bit "B" along the axis of the guide, perpendicular to the flat surface 117 of ring 115. The guide 1 is now placed against the surface "S" in which a hole is to be drilled, the ring 115 being placed flat against the surface so as to position the drill bit "B" perpendicular thereto. The drill is then operated and pushed against the surface. The drill is guided perpendicularly toward the surface "S" by the rods 121 moving into the bores 127 in the legs 65. The rods 121 and legs 65 guide the drill bit in a direction perpendicular to the ring 115 and thus to the surface being drilled onto. When drilling is finished, the drill bit is removed from the hole and springs 135 bias ring 115 away from the drill holding means 3 toward which it moved during drilling. The drill "D" is then pulled away from the drill guide 1.

In another embodiment illustrated in FIGS. 3 and 3A, the holding means used on the centering receptacle 25 for holding the drill "D" in the guide 1, comprise inwardly biased balls 151 mounted in the receptacle 25 in the inner wall 153 of the large cylindrical portion 35. The balls 151 are located to cooperate with the usual operating holes "H" on the chuck "CH" of the drill "D", the balls being biased into the holes "H" when the drill is properly positioned in the receptacle so as to hold the drill in the guide 1. The balls 151 are mounted in holes 155 extending into the receptacle wall 35 to its inner surface 153. Spring means 157 in the holes 155 bias the ball 151 inwardly towards the chuck and a suitable collar 159 retains the outwardly biased balls in the holes.

Several improvements can be provided in the above described drill guide. For example, one of the rods 121 can be threaded over a portion 171 of its length and a nut 173 can be threaded on the one rod so as to provide an adjustable stop. The stop nut 173 abuts the end 77 of a leg 65 to limit penetration of the drill bit "b" to a preselected depth.

V-shaped grooves 181 can also be made in the upper surface of the ring 115 of the guide positioning means 5 to provide instant centering of a round stock to be drilled.

A set of threadable stops 183 can also be provided to help in positioning the drill guide 1 when edge drilling. In use, these stops which, otherwise, may be threadably held in the upper surface of the ring 115, are threaded in the lower surface thereof through the flat, cushioned locating surface 117 and extend downwardly from the latter. The drill guide 1 is placed flat on the edge of the stock to be drilled and turned about its vertical axis to tighten the stops 183 against the sides of the stocks. This allows for precision alignment of the drill bit "B", especially in jobs such as doorlatch installation or a stud drilling.

I claim:

1. A drill guide comprising:

(a) drill holding means including a leg support, drill centering means and a set of tubular legs extending from the leg support to the centering means for connecting the same together, said drill centering means being slidably mounted on the legs for movement toward or away from the leg support and including means for fixing the drill, (b) guide positioning means, (c) a set of rods slidably mounted in the tubular legs for movably connecting the drill holding means and guide positioning means together, and (d) manually operable means on the drill holding means for use in adjusting the distance between the positioning means and the centering means; said manually operable means comprising a locking member on the drill centering means and spaced-apart stops on the legs, said locking member being rotatably mounted on the drill centering means, and including means provided for retaining the locking member in a locked position, said locking member being operable to selectively cooperate with the stops to lock the drill centering means in a selected position on the legs.

2. A drill guide as claimed in claim 1, wherein the retaining means comprises cooperating magnets on the locking member and the drill centering means.

3. A drill guide as claimed in claim 1, wherein the retaining means comprises spring means connected between the locking member and the drill centering means to rotatably bias the locking member to a locked position.

4. A drill guide as claimed in claim 1, wherein the drill fixing means comprises a magnetic ring.

5. A drill guide as claimed in claim 1, wherein the drill fixing means comprises a set of fixing members arranged in a circle, and means for radially and inwardly biasing the members toward the drill.

6. A drill guide as claimed in claim 1, wherein resilient means are provided within the legs for normally biasing the guide positioning means away from the drill holding means.

* * * * *